Nov. 3, 1964　　　A. BOUWERS　　　3,155,832
PANORAMIC INFRARED TELESCOPE

Filed March 27, 1961　　　2 Sheets-Sheet 1

INVENTOR.
ALBERT BOUWERS
BY
*Nenderoth, Lind & Ponack*
ATTORNEYS

Nov. 3, 1964  A. BOUWERS  3,155,832
PANORAMIC INFRARED TELESCOPE
Filed March 27, 1961  2 Sheets-Sheet 2

INVENTOR.
ALBERT BOUWERS
BY
ATTORNEYS

3,155,832
PANORAMIC INFRARED TELESCOPE
Albert Bouwers, The Hague, Netherlands, assignor to N.V. Optische Industrie de Oude Delft, Delft, Netherlands
Filed Mar. 27, 1961, Ser. No. 98,432
Claims priority, application Netherlands, Apr. 2, 1960, 250,105
6 Claims. (Cl. 250—213)

The invention relates to a periscope, that in a telescope in which the emerging beam of light rays is displaced a certain distance transversely to the entering light beam. Telescopes of this type are primarily used in cases where for reasons of safety or otherwise the exit pupil of the telescope must be positioned at a level different from that of the entrance pupil. A further reason for using periscopes may be the desire to reduce the dimension of the instrument in the direction of sight.

More particularly, the invention relates to a periscope comprising an image converter, a front optical system having an objective projecting an image of the object space onto the photo cathode of the image converter, and a rear optical system having a magnifying system for observing the fluorescent screen of the image converter, wherein said front system is provided with a reflecting surface under an angle of 45° with respect to the axis of the image converter. Front and rear optical systems are terms used herein to designate the complete systems of refracting and reflecting elements which are situated in the path of light rays in front of the image converter, that is between the object and the image converter, and in the rear of the image converter, that is between the latter and the observer's eye, respectively.

Periscopes of the type indicated in which the image converter tube is usually arranged with its axis vertically, are applied e.g. in combination with infrared head lights in military vehicles so as to permit driving the vehicles at night without being visible to the unaided eye.

One very important requirement for such instruments is that their field of view, especially in the horizontal direction, is as wide as possible. This is the more essential since the usual rotation of the telescope about a vertical axis to scan a large horizontal field is impossible in many armoured vehicles. The telescopes must be mounted therein in a fixed position relative to a small aperture in the armor-plating and the axis of the eye piece or eye pieces must not change its position too much in view of the fact that the observer can only make slight movements. As is well-known, the present state of optical art does not provide for well corrected objectives which combine a relative aperture larger than e.g. $f/1$ with an angular field larger than 40°. By incorporating anamorfotic optical systems in the front and rear optics it has been possible to increase the horizontal field in a certain degree, the anamorfotic factor of such systems, however, is rather limited.

In panoramic telescopes it has been known for long to increase the field of view by rotating a 45° reflector in front of the telescope objective about a vertical axis so as to scan a large horizontal field. Such rotation, however, produces a tilting of the image which must be compensated by arranging an image-rotating prism, such as an Abbe prism, in the optical path which prism must be rotated at half the angular speed of the 45° mirror. Such a prism would necessitate a large increase of the telescope dimensions, particularly the height of the instrument, which in the case of the periscopes discussed herein will usually be inadmissible in view of the fact that the image converter already occupies a considerable height.

The invention provides for a combination of measures which, without increasing the dimensions of the instrument appreciably, permits a large increase of the field of view to be attained. In accordance with the invention, the front optical system comprises a second reflecting surface which is substantially parallel to the image converter axis and reflects the light rays entering from the object space toward the 45° reflecting surface, said second reflecting surface being rotatable about an axis substantially parallel to the image converter axis, the magnifying system in the rear optical system comprising an objective and one or two eye pieces which all have positive optical power, and said rear optical system having reflecting surfaces so disposed as to form, together with the reflecting surface in the front optical system, an image erecting system.

By rotating the second reflector in the front optical system about a vertical axis, which, preferably, lies in the plane of the reflector, essentially the whole horizon may be scanned by the periscope except for a relatively small angle which is obstructed by the 45°-reflector. In accordance with the invention, the latter angle may be scanned as well, if the telescope is made rotatable as a whole about an axis parallel to the image converter axis through an angle which is at least equal to the angle of subtense of the 45°-reflector as seen from the axis of rotation of the second reflecting surface. The rotation of the second reflecting surface does not result in tilting of the image as does the rotation of the 45°-mirror in the well-known panoramic telescope. An image restoring rotating prism may thus be omitted. However, the addition of a reflector in the front optical system changes the orientation of the image which effect has to be compensated by further steps. According to the invention such further steps consist in the provision of reflecting surfaces in the rear optical system such that the reflectors in the front and rear optical systems, in combination, will completely erect the image, and in so constructing the magnifying system in the rear optical system that this too provides for a complete image inversion. The periscope of the invention, accordingly, comprises at least four image inverting systems, viz. the objective in the front optical system, the image converter, the magnifying system in the rear optical system and the system made up of the plane reflecting surfaces in front and rear optical systems. As the number of image inversions is even, the correct image orientation is obtained.

The system of plane reflecting surfaces may consist e.g. of no more than four reflectors which, in a certain position of the rotatable reflector in the primary optical system, are arranged in a way similar to the reflecting surfaces of a Porro prism system of the second type. However, more complex systems in which use may be made of special prisms, such as e.g. roof prisms, and penta prisms are likewise possible. Due to the application in the rear optical system of a magnifying system having an objective and one or two eye pieces which all have positive power it is possible to combine in this system a satisfactory image quality with the high magnification and large exit pupil required.

In accordance with the invention the 45° reflecting surface in the front optical system was preferably made rotatable about an axis perpendicular to the plane of incidence of the axial ray, that is the light ray traveling along the optical axis, on that reflector. Thereby it becomes possible to scan a certain vertical field which is limited by the height of the second reflecting surface via which the light rays travel toward the 45° reflector.

Image erecting systems consisting of four reflecting surfaces of which, when numbered in the direction of light travel, the first and second ones are rotatable about axes perpendicular to each other such that the field of view can be scanned in two directions without any resultant tilting of the image, as applied to optical panoramic telescopes, are known per se from the Netherlands patent specification 80,456. It was unobvious, and has, in fact, never been proposed heretofore however, to apply such a system in periscopes having an image converter since, as is well-known, such periscopes pass an inherent image erecting element in the form of the image converter itself and there was no need, therefore, unlike the conventional terrestrial telescope, for a separate image erecting system of lenses, mirrors or prisms.

The invention, therefore, provides for the first time an infra-red periscope of moderate dimensions which enables in a practical way e.g. the driver of an armoured vehicle to observe a very large portion of the terrain.

The invention will now be described with reference to the drawings in which two of its embodiments are schematically shown in perspective.

Figure 1:
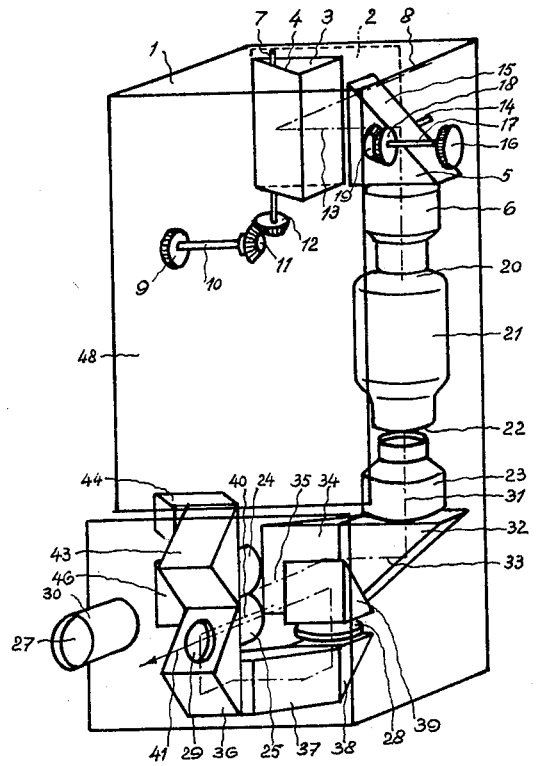
FIG. 1 shows a periscope having a relatively large but still limited horizontal field of view.
Figure 3:
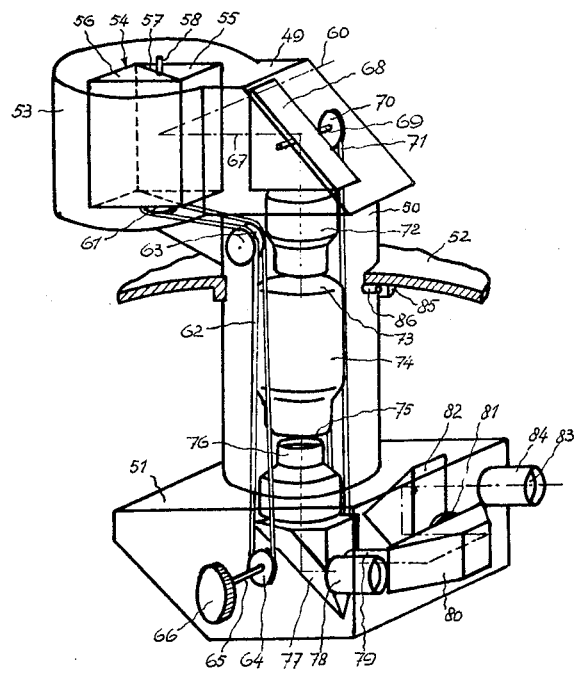
FIG. 3 shows a further example of a periscope which has provisions for scanning an unlimited horizontal field of view.

In FIGS. 1 and 3 for reasons of clarity only the outlines of the instrument housing are shown so that the internal parts of the instrument could readily be shown. The instrument of FIG. 1 is viewed from the side of the observer. On the side of the object the housing 1 has, near its top, a transparent window 2 which may consist of a plane parallel glass plate. The dimensions of the window 2 are selected in accordance with the horizontal and vertical field required, for the periscope. Through the window the light rays (or infra-red rays, as the case may be) enter the front optical system consisting of a 45°-prism 3, a 45°-prism 5 and an objective lens 6. The prism 3 is secured to a shaft 7 for rotation about a vertical axis in the hypotenuse plane 4 whereby the axial ray 8, that is the light ray travelling along the optical axis, is made to scan the object space in horizontal direction. The rotation of the prism 3 is obtained by means of a knob 9 which is secured to a shaft 10 traversing the wall of the instrument housing. The shaft 10 is coupled to shaft 7 by a pair of conical gears 11 and 12.

The reflecting surface 4 directs the reflected axial light ray 13 into the prism 5 which bends the ray downward through an angle of substantially 90°. In the example shown the prism 5 is likewise rotatable, namely about a horizontal axis which is perpendicular to the plane of incidence of the axial ray 13 and lies in the hypotenuse surface 15 of the prism. When prism 5 is thus rotated the axial ray 8 will scan the object space in vertical direction, the vertical field being limited by the height of the prism 3. Prism 5 is secured to the shaft 14 and may be actuated by a knob 16 whose shaft 17 is coupled to the axis 14 by conical gears 18 and 19.

The objective 6 which has a large relative aperture projects an image of the part of the field which is selected for observation by the prisms 3 and 5 onto the photocathode 20 of a conventional image converter 21 which converts and amplifies the image electron-optically and reproduces it on the fluorescent screen 22 at the lower end of the tube. The fluorescent image is observed by means of a rear optical system having a magnifying system which in the embodiment shown is binocular. The magnification of the magnifying system is selected such that the over-all magnification of the periscope lies in the order of unity. In practical cases this means that the magnification of the rear optical system is in the order of from 10 to 20.

The binocular magnifying system consists of a single objective 23 of large absolute aperture, a pair of identical objectives 24 and 25 of smaller absolute aperture having parallel axis and a pair of eye pieces each having a field lens and an eye lens which are separated by a prism. Field lens and eye lens of the left hand eye piece are designated 26 (see FIG. 2) and 27, respectively, those of the right hand eye piece are designated 28 and 29, respectively. Only one of the eye piece tubes projecting from the periscope housing 1 has been illustrated in FIG. 1 and is designated 30.

The focal plane on the object side of the objective 23 coincides with the image screen of the image converter 21 such that parallel beams of light emerge from the objective 23 which are divided by the objectives 24 and 25. The latter objectives, together with the eye pieces, constitute a binocular telescope which is adjusted to infinite object distance. This telescope, in combination with the objective 23, forms a binocular microscope, however, whose objectives have a common front lens in the form of the objective 23.

The axial ray 31 of the parallel beam of light emerging from the objective 23 is reflected by the 45°-prism 32 to the left (ray 33) and only then is bent forward by the 45°-prism 34 (ray 35). The prisms 3 and 5 in the front optical system and the prisms 32 and 34 in the rear optical system, in the situation shown, are positioned so as to define a Porro prism system of the second type which, as is well-known, yields complete image erection.

Figure 2:
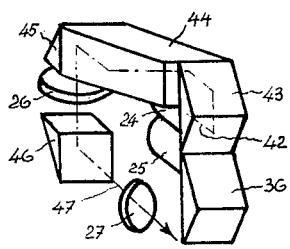
FIG. 2 shows a part of the rear optical system of the periscope according to FIG. 1.

The magnifying system described and consisting of the common objective 23, the telescope objectives, 24 and 25, and the eye pieces 26, 27, and 28, 29 also inverts the image completely. Each of the telescope halves in the rear optical system comprises a further series of prisms which have for purpose to fold the optical path and to put the eye pieces on one and the same level and at the correct interpupillary distance. For the right hand telescope half this series consists of a 90°-prism 36, a rhomboid prism 37 and the 45°-prisms 38 and 39 having the eye piece field lens 28 between them. The axial ray 40 of the parallel beam emerging from the telescope objective 25 is shown in FIG. 1 as it travels through the system and this will need no detailed comment. The ray emerges from the eye lens 29 as ray 41. The left hand telescope half as illustrated in FIG. 2, is similarly arranged with the exception that here the axial ray 42 is first deviated upward, then to the left and finally downward where it emerges as ray 47. The prism system consists of the 90°-prism 43, the rhomboid prism 44 and the 45°-prisms 45 and 46, having the field lens 26 between them. Each of the additional prism system discussed herein contains six reflective surfaces which are parallel in pairs and, consequently, have no resulting effect on image orientation. As stated before, their purpose is to fold the path of light rays in such a way as to minimize the space occupied.

In the periscope as shown in FIG. 1 the space under the prism 3 is free. In this space an electric battery and a high voltage source for the image converter can be conveniently housed so that a compact instrument is obtained.

The periscope shown in FIG. 3 has a very wide horizontal field of view. The instrument's housing consists of three parts which are rigidly connected to each other and are designated 49, 50 and 51 in the drawing. The middle part 50 is cylindrical and traverses the upper wall 52 of a space in which the observer is placed, e.g. the dome of an armoured vehicle. Thus, the upper part 49 of the instrument projects from the vehicle so as to avoid obstruction of the field by the latter. The upper part or head 49 is provided with a cylindrical window 53, e.g. of glass, whose vertical axis coincides with the axis of rotation of a rotatable prism 54 which takes the place of the 45°-prism 3 of FIG. 1. The rotatable prism 54 is secured to a shaft 58 and is made up of two 45°-prisms 55 and 56 whose hypotenuse surfaces have been coated with a reflective layer and thereafter have been cemented together. Thus, the diagonal surface 57 is reflective at both sides. As the function of such a prism is well-known in the art it will be sufficient for the purpose of this description to state that by rotating the prism on shaft 58 the axial ray 60 of the beam entering the prism will scan the entire horizon except for a small part which is obstructed by the 45°-prism 68 or by the part of the instrument housing receiving this prism. To enable the observer to turn the prism 54 the shaft 58 is coupled to a knob 66 on a shaft 65 projecting from the lower part of the housing, through a pulley 61, a rope 62 guided by auxiliary pulleys 63, and a pulley 64.

The 45°-prism 68 which directs the axial ray 67 downward in analogy to the prism 15 in FIG. 1, is rotatable on a horizontal shaft 69 such that a limited vertical field determined by the height of prism 54 may be scanned. The observer can make prism 68 to rotate by means of a pulley 70 on the shaft 68 which through a rope 71 is driven by a pulley in the lower part of the instrument (not shown).

The front optical system in FIG. 3 further contains the objective 72 of large relative aperture which projects an image onto the photocathode 73 of the image converter 74. The anode screen 75 of this tube coincides with the focal plane of the objective 76. Accordingly parallel light beams emerge from the latter objective which, by a roof prism 77 are reflected to the right. The light beams are divided by two objectives 78 and 79 of small absolute aperture which are positioned alongside each other with their axes parallel. Thus, similarly to FIG. 1, a twin objective is formed consisting of the objectives 78 and 79 and the common front member 76. For reasons of clarity, of the remaining parts of the rear optical system only those have been illustrated which form part of the telescope half remote from the reader, that is to say, a truncated 90°-prism 80, an eye piece field lens 81, a 90°-prism 82 and an eye piece eye lens 83, mounted in an eye piece tube 84. The prisms 80 and 82 constitute a Porro prism system of the first type which, together with a similar system in the other telescope half brings the eye piece axes at the required distance. It will be easily seen that in this example as well as in the embodiment of FIGS. 1 and 2 the reflecting surfaces in the front optical system, together with those in the rear optical system constitute an image inverting system.

In the example shown in FIG. 3 the complete instrument may be rotated through a limited angle about the axis of the tubular middle part 50 so as to bring the "dead angle" caused by the prism 68 within the field of view of the periscope. The collar 85 which surrounds the tube 50 is interrupted through the desired angle and to the wall of the tube a pin 86 is secured which abuts against the collar 85 in the extreme positions of the periscope.

What I claim is:

1. In a panoramic infrared periscope the combination of an infrared image converter tube of the image-inverting type having its axis vertical, a first objective lens disposed over said image converter tube and projecting an image of a scene to be observed onto the photocathode thereof, first and second plane reflecting surfaces arranged in optical alignment with said first objective lens in the object space thereof so as to successively reflect light rays from the scene before entering said first objective lens, the first reflecting surface being disposed vertically and rotatable about a vertical axis so as to permit scanning of the object space in horizontal direction, said second reflecting surface being disposed over said first objective lens under an angle of about 45° to the optical axis thereof, a second objective lens disposed under said image converter tube for forming a real optical image of the fluorescent screen of said tube, an eye piece of positive optical power to view said real image formed by said second objective lens, said eye piece having its axis horizontal, and a system of plane reflecting surfaces fixedly disposed in optical alignment in the path of light rays travelling from the fluorescent screen of said image converter tube to said eye piece so as to form, together with said first and second reflecting surfaces in the object space of said first objective lens, an image inverting system whereby an erect image of the scene to be observed is seen in the eye piece.

2. In a panoramic infrared periscope, the combination as claimed in claim 1 wherein said second reflecting surface is rotatable about a horizontal axis parallel to said second reflecting surface so as to permit scanning of the object space in vertical direction through a small angle predetermined by the height of said first reflecting surface.

3. In combination with a supporting structure, a panoramic infrared periscope having the combination as claimed in claim 1 wherein said periscope as a whole is supported for rotation relative to said structure about a vertical axis through an angle at least equal to the angle of subtense of said second reflecting surface with respect to the axis of rotation of said first reflecting surface.

4. In a panoramic infrared periscope the combination of an infrared image converter tube of the image-inverting type having its axis vertical, a first objective lens disposed over said image converter tube and projecting an image of a scene to be observed onto the photocathode thereof, first and second plane reflecting surfaces arranged in optical alignment with said first objective lens in the object space thereof so as to successively reflect light rays from the scene before entering said first objective, the first reflecting surface being disposed vertically and rotatable about a vertical axis so as to permit scanning of the object space in horizontal direction, said second reflecting surface being disposed over said first objective lens under an angle of about 45° to the optical axis thereof, a second objective lens disposed under said image converter tube and having its focal plane in the fluorescent screen thereof so as to collimate the light rays received from the fluorescent screen, third and fourth ojective lenses so disposed as to each receive a portion of the collimated light rays transmitted by said second objective and focus the same to a pair of identical real optical images of the fluorescent screen, first and second eye pieces of positive optical power in optical alignment with said third and fourth objective lenses, respectively said eye pieces having horizontally disposed parallel axes and permitting binocular viewing of said pair of real images, and a system of plane reflecting surfaces fixedly disposed in optical alignment in the paths of light rays travelling from the fluorescent screen to each of said eye pieces so as to form, together with said first and second reflecting surfaces in the object space of said first objective lens, an image inverting system whereby an erect image is binocularly seen in said eye pieces.

5. In a panoramic infrared periscope the combination of an infrared image converter tube of the image-inverting type having its axis vertical, a first objective lens disposed over said image converter tube and projecting an image of a scene to be observed onto the photocathode thereof, first and second plane reflecting surfaces arranged in optical alignment with said first objective lens in the object space thereof so as to successively reflect light rays from the scene before entering said first objective lens, the first reflecting surface being disposed vertically and rotatable about a vertical axis so as to permit scanning of the object space in horizontal direction, said second reflecting surface being disposed over said first objective lens under an angle of about 45° to the optical axis thereof, a second objective lens disposed under said image converter tube and having its focal plane in the fluorescent screen thereof so as to collimate the light rays received from the fluorescent screen, third and fourth plane reflecting surfaces fixedly located in optical alignment in the image space of said second objective lens so as to successively reflect the collimated light rays transmitted by said second objective lens, said third reflecting surface being disposed under an angle of about 45° to the optical axis of said second objective lens and at a substantially right angle with said second reflecting surface, said fourth reflecting surface being disposed vertically, a pair of telescope objective lenses so disposed as to each receive a portion of the collimated light rays reflected by said fourth reflecting surface and focus the same to a pair of identical real optical images of the fluorescent screen, and a pair of eye pieces of positive optical power in optical alignment with said telescope objective lenses, said eye pieces having horizontally disposed axes and permitting binocular viewing of said pair of real images.

6. In a panoramic infrared periscope the combination of an infrared image converter tube of the image-inverting type having its axis vertical, a first objective lens disposed over said image converter tube and projecting an image of a scene to be observed onto the photocathode thereof, first and second plane reflecting surfaces arranged in optical alignment with said first objective lens in the object space thereof so as to successively reflect light rays from the scene before entering said first objective lens, the first reflecting surface being disposed vertically and rotatable about a vertical axis so as to permit scanning of the object space in horizontal direction, said second reflecting surface being disposed over said first objective lens under an angle of about 45° to the optical axis thereof, a second objective lens disposed under said image converter tube and having its focal plane in the fluorescent screen thereof so as to collimate the light rays received from the fluorescent screen, a roof prism disposed under said second objective lens having its roof edge substantially parallel to said second reflecting surface, a pair of telescope objective lenses so disposed as to each receive a portion of the collimated light rays reflected by said roof prism and focus the same to a pair of identical real optical images of the fluorescent screen, a pair of eye pieces of positive optical power in optical alignment with said telescope objective lenses, said eye pieces having horizontally disposed axis and permitting binocular viewing of said pair of real images, and an image inverting prism system in the path of light rays between each of said telescope objective lenses and said eye pieces whereby an erect image of the screen to be observed is seen in said eye pieces.

References Cited by the Examiner

UNITED STATES PATENTS

| 2,625,853 | 1/53 | Hayward | 88—72 |
| 2,669,902 | 2/54 | Barnes | 88—72 |
| 2,812,687 | 11/57 | Eitel et al. | 88—72 |
| 2,818,773 | 1/58 | Bouwers | 88—72 |
| 2,970,220 | 1/61 | Bouwers | 250—213 |
| 2,981,842 | 4/61 | Kaufold. | |
| 2,998,518 | 8/61 | Guntert | 250—213 X |

FOREIGN PATENTS 684,044 11/39 Germany.

RALPH G. NILSON, *Primary Examiner.*

RICHARD M. WOOD, ARCHIE R. BORCHELT,
*Examiners.*